Patented Sept. 8, 1931

1,822,525

UNITED STATES PATENT OFFICE

WILLY O. HERRMANN, HANS DEUTSCH, AND ERICH BAUM, OF MUNICH, GERMANY, ASSIGNORS TO CONSORTIUM FUR ELEKTROCHEMISCHE INDUSTRIE, OF MUNICH, BAVARIA, GERMANY

METHOD FOR THE MANUFACTURE OF ESTERS OF VINYL ALCOHOL

No Drawing. Application filed February 1, 1928, Serial No. 251,224, and in Germany February 12, 1927.

It is known that esters of vinyl alcohol may be obtained along with esters of ethylidene glycol when acetylene is conducted with the vapor of a carboxylic acid over a heated catalyst. However, the comparatively large amounts of undesirable by-products, as for example esters of ethylidene glycol, aldehydes, etc., and the consequent slowing down of the process have all operated to make the commercial production of vinyl esters up to this time a matter of considerable difficulty and expense.

We have now found a method for the preparation of esters of vinyl alcohol as practically the sole product of the reaction between acetylene and a carboxylic acid.

In addition to the formation of vinyl esters in large amounts, our method aids at the same time in the repression of undesirable side reactions, also an essential increase in production results, and finally, the life of the catalyst is lengthened. The method depends upon driving a vapor mixture consisting of acetylene and vaporized carboxylic acid at a high velocity and in large quantities over a heated active catalyst.

The most suitable velocity is dependent upon the size and filling of the reaction space, upon the size and surface of the contact, and upon the proportion of the reaction components in the mixture, etc. In general, however, an essential for carrying out this method is to drive the reaction components quickly over the surface of the contact, with such velocity that a larger quantity of the reaction components is carried past a given contact surface in a given period of time, than the amount which would be carried past and approximately completely reacted by the use of lower velocities. In other words, the velocity is high enough that the quantity of the reaction materials driven past the catalyst is greater than the quantity reacting under the given conditions. The best results are obtained when at least twice as much vapor mixture is led over the catalyst as that which enters into reaction.

Of course the reactants are only partially changed during a single passage over the catalyst; but the hourly production of a given contact is thus considerably increased; an advantage far over balancing the decrease in the concentration of vinyl ester in the products. This deliberate sacrifice of a complete conversion of the reactants represses the formation of esters of ethylidene glycol, and the economy in the production of esters of vinyl alcohol is increased to a surprising degree.

After separating the reaction product the unchanged part of the reaction components may again be circulated through the reaction space. This circulation is not only expedient for unchanged acetylene, but it has also proved an especial advantage to separate the carboxylic acid, containing a small amount of ethylidene diacetate, from the reaction vapors by means of partial condensation and to introduce this acid directly into the process again. Another way of operating is to condense all the reaction products, distill off the vinyl acetate, and conduct the residue of carboxylic acid and its small content of ethylidene diacetate into the process again.

The acetylene and carboxylic acid vapors can be sent through the reaction space in stoichiometric proportions. However, advantages are obtained by having acetylene in excess of the molecular amount necessary to react with carboxylic acid to form vinyl ester. If one uses acetylene in excess of the stoichiometric amount for reaction, complete conversion is favored. If one uses carboxylic acid in excess, the life of the catalyst is lengthened.

When the reactants are driven past the contact rapidly there results not only a maximum product from a given quantity of catalyst but side reactions, as formation of acetone when using acetic acid, undesirable changes in reaction product, e. g. transformation into ethylidene ester, and changes of contact, e. g. becoming sooty, resinified, and the like, are hindered.

By passing large quantities of vapor past the catalyst the additional advantages are obtained of distributing the heat of reaction uniformly, and local heating and accumulation of heat are prevented.

By this method it is possible to use reaction temperatures of 300° C. and above without injury to the activity of the contact and without decomposition on the part of acetylene or carboxylic acid or the occurrence of side reactions. This possibility of a high reaction temperature is used with the method of rapid transit of reaction components to make possible a further increase in production.

We have also found, that the process of manufacture of vinyl esters can be accomplished very simply and smoothly, and with a further increase in economy, if the mixture of acetylene and carboxylic acid vapors is preheated before its introduction into the reaction space, preferably up to the reaction temperature or even somewhat higher. By this preheating one needs to introduce into the catalyst space itself only a small amount of additional heat, or none at all, according to the dimensions of the reaction apparatus. By this means there is not only obtained a technical advantage in heating, but what is more, this preheating results in an especially uniform progress of the chemical reaction. Injurious superheating of the catalyst is also hindered and a very uniform distribution of heat and flow of reaction products is attained. Various metal salts absorbed in porous carriers may be used as contacts. Zinc-, cadmium-, and mercury salts, particularly the zinc and cadmium salts of the carboxylic acids to be esterfied, are especially active. Strong adsorptive bodies come into consideration as carriers to be impregnated with the catalytically active salts. For example, silica gel, wood charcoal, active or highly active carbon and the like are suitable.

Suitable reaction temperatures for the conditions subsequently described herein lie between 180°–300° C. However, at any time, the location of the most advantageous temperature interval depends naturally upon the kind of carboxylic acid used, the vapor and gas velocity, and upon the nature and also the age of the catalyst. In general the rule holds, that the more quickly one conducts the reaction vapors over the contact the higher the reaction temperatures which can be used and consequently the more effectively the reaction can be promoted. For this reason the method is not limited to the temperatures given in the examples.

By means of passing the reaction materials quickly over the catalyst, the conversion of carboxylic acids into esters of vinyl alcohol is favored, and the esters are inexpensively produced. Examples of some carboxylic acids that may be mentioned here are acetic acid, chloro acetic acid, propionic acid, and butyric acid.

*Example I*

From 4–5 cubic meters of acetylene per hour were passed through a vaporizer, out of which at the same time about 5 kg. per hour of acetic acid were vaporized. The resulting vapor mixture was first sent through a preheater in which it was heated to 220°–250° C. The vapor mixture so preheated was then introduced into a reaction space of 7 liters capacity which was completely filled with catalyst. This catalyst consisted of 7 liters of granular active carbon which had been impregnated with about 1 kg. of zinc acetate. The temperature of the reaction space was adjusted between 210°–250° C. By good insulation, and the use of even this small apparatus, only a slight second heating of the materials at the point of reaction was necessary in order to maintain the reaction temperature. A vapor mixture came from the reaction space consisting of 13%–16% of vinyl acetate, the other component being essentially unchanged acetic acid. This vapor mixture was sent through a condenser and condensed. The excess of acetylene which was separated from the condensate was led through a circulating pump to the acetic acid vaporizer again, and by this means put into circulation. At the same time fresh acetylene corresponding to that consumed in the circulating system was introduced. Acetic acid was put in the vaporizer in proportion to the amount being vaporized. The vinyl acetate was obtained by fractional distillation from the reaction products which, in addition to acetic acid and vinyl acetate, also contained a small quantity of acetaldehyde and ethylidene di-acetate, 0.5 kg.–0.7 kg. of vinyl acetate were obtained per hour. The acetic acid remaining after the distillation, containing a small quantity of ethylidene di-acetate, was again added to the process. A special advantage results from carrying back this acetic acid into the process, since the small content of ethylidene di-acetate interferes with any additional formation of this product, and the use again from time to time of this residual acetic acid results practically in the production of vinyl acetate only. The process can be carried out for months at a constant rate of production.

On the other hand, when only 0.1 kg. of acetic acid and 40–50 liters of acetylene are sent hourly through the same apparatus, under otherwise the same conditions as the above, there was attained approximately complete conversion, but the production scarcely amounted to 0.1 kg. of vinyl acetate per hour. Besides, the catalyst diminished in activity much sooner.

Also from the standpoint of heating technique, the sending through of small quantities of vapors proves to be much more unsuitable than in the above described form for carrying out the invention. Therefore the present invention is adaptable to use in manufacturing units that are as large as one might desire, since the transfer of the necessary heat to the reaction can be provided in an ideal manner by preheating large quantities of reaction material. The depicted difficulties, such as the danger of superheating, and the scarcely practicable heating of the catalyst space in a uniform manner, grow with every increase in size of apparatus unless one observes these specified conditions.

Example II

The same procedure was followed as that given in Example I. A reaction space was used which contained 30 liters of active carbon which had been impregnated with 2 kg. of zinc acetate. About 16 kg. of acetic acid vapor and a circulating stream of 15 cubic meters—20 cubic meters of acetylene were sent through the apparatus per hour. The reaction product contained 13%–16% vinyl acetate. The hourly production of vinyl acetate was 2.1 kg.–2.5 kg.

Example III

Using the procedure of Example II, 6 kg.–10 kg. of acetic acid vapor and 3 cubic meters—4 cubic meters of acetylene per hour were sent through the 30 liters of reaction space containing the catalyst. The condensed reaction product contained 15%–30% of vinyl acetate. The rate of production was 1.5 kg.–2 kg. of vinyl acetate per hour.

Example IV 24 kg.–26 kg. of acetic acid vapor and a circulating stream of 25 cubic meters—30 cubic meters of acetylene were sent hourly through the reaction space described in Example II, filled with 30 meters of catalyst. The reaction materials were preheated to 240°–320° C. and maintained at 240°–300° C. in the catalyst space. An hourly production of 3.0 kg.–3.5 kg. of vinyl acetate of 12%–15% concentration was obtained.

Example V 20 kg.–25 kg. of butyric acid vapor mixed with 15 cubic meters—20 cubic meters of acetylene were conducted through a reaction space filled with 30 liters of active carbon which had been impregnated with about 3 kg. of zinc butyrate. The mixture of reaction materials was preheated to 250°–280° C. and the catalyst space was held at 240°–270° C. By operating in the same manner as in the previous examples, there was obtained in addition to unchanged butyric acid 2 kg.–3 kg. of vinyl butyrate hourly, and of a concentration of 8%–15%.

What we claim is:

1. Process for the preparation of esters of vinyl alcohol comprising conducting a mixture of acetylene and the vapor of a carboxylic acid over a heated catalyst at a velocity measured at the reaction temperature of more than 350 liters per hour per liter of reaction space.

2. Process for the preparation of esters of vinyl alcohol comprising conducting a mixture of acetylene and the vapor of a carboxylic acid over a heated catalyst at a velocity measured at the reaction temperature of more than 350 liters per hour per liter reaction space, and using an excess of acetylene over the stoichiometric amount needed to form vinyl ester.

3. Process for the preparation of esters of vinyl alcohol comprising preheating a mixture of acetylene and the vapor of a carboxylic acid, conducting the preheated mixture over a heated catalyst at a velocity measured at the reaction temperature of more than 350 liters per hour per liter of reaction space, removing reaction products and recirculating the excess of acetylene over the catalyst.

4. Process for the preparation of esters of vinyl alcohol comprising conducting a mixture of acetylene and the vapor of a carboxylic acid over a heated catalyst comprising a salt of the zinc-cadmium group and a carrier at a velocity measured at the reaction temperature of more than 350 liters per hour per liter reaction space.

5. Process for the preparation of esters of vinyl alcohol comprising conducting a mixture of acetylene, and the vapor of a carboxylic acid over a heated catalyst comprising a salt of the zinc-cadmium group and a carrier at a velocity measured at the reaction temperature of more than 350 liters per hour per liter reaction space, the amount of acetylene being in excess of the stoichiometric amount needed to form vinyl ester.

6. Process for the preparation of vinyl acetate comprising conducting a mixture of acetylene and acetic acid vapor over a catalyst heated to 180°–300° C. at a velocity measured at the reaction temperature of more than 350 liters per hour per liter reaction space.

7. Process for the preparation of vinyl acetate comprising conducting a mixture of acetylene and acetic acid vapor over a catalyst heated to 180°–300° C. at a velocity measured at the reaction temperature of more than 350 liters per hour per liter reaction space, the amount of acetylene being in excess of the stoichiometric amount needed to form vinyl ester.

8. Process for the preparation of vinyl acetate comprising conducting a mixture of acetylene and acetic acid vapor over a heated catalyst comprising a salt of a metal of the zinc-cadmium group and a carrier at a velocity measured at the reaction temperature of 350 liters per hour per liter reaction space, said catalyst being heated to 180°–300° C.

9. Process for the preparation of vinyl acetate comprising preheating a mixture of acetylene and acetic acid vapor, conducting the preheated mixture over a catalyst comprising a salt of a metal of the zinc-cadmium group and a carrier and heated to 180°–300° C. at a velocity measured at the reaction temperature of more than 350 liters per hour per liter reaction space, the amount of acetic acid being in excess of the stoichiometric amount needed to form vinyl acetate.

10. Process for the preparation of vinyl acetate comprising preheating a mixture of acetylene and acetic acid vapor, conducting the preheated mixture over a catalyst comprising a salt of a metal of the zinc-cadmium group and a carrier and heated to 180°–300° C. at a velocity measured at the reaction temperature of more than 350 liters per hour per liter reaction space, removing reaction products and recirculating the excess of reactants over the catalyst.

11. Process for the preparation of vinyl acetate comprising preheating a mixture of acetylene and acetic acid vapor, conducting the preheated mixture over a catalyst comprising zinc acetate and a carrier and heated to 180°–300° C. at a velocity measured at the reaction temperature of more than 350 liters per hour per liter reaction space, removing reaction products and recirculating the excess of reactants over the catalyst.

12. Process for the preparation of vinyl acetate comprising preheating a mixture of acetylene and acetic acid vapor, conducting the preheated mixture over a catalyst comprising zinc acetate and a carrier and heated to 180°–300° C. at a velocity of 350 liters per hour per liter reaction space, separating vinyl acetate from the exit gases, and returning the excess acetylene and excess acetic acid with its contents of ethylidene diacetate to the reaction.

WILLY O. HERRMANN.
HANS DEUTSCH.
ERICH BAUM.